United States Patent
Draser et al.

(10) Patent No.: US 8,425,123 B2
(45) Date of Patent: Apr. 23, 2013

(54) RADIAL NEEDLE BEARING UNIT

(75) Inventors: Georg Draser, Nuremberg (DE); Martin Gegner, Uehlfeld (DE); Juergen Weiss, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 778 days.

(21) Appl. No.: 12/599,752

(22) PCT Filed: Apr. 14, 2008

(86) PCT No.: PCT/EP2008/054480
§ 371 (c)(1),
(2), (4) Date: Nov. 18, 2009

(87) PCT Pub. No.: WO2008/138698
PCT Pub. Date: Nov. 20, 2008

(65) Prior Publication Data
US 2010/0303397 A1 Dec. 2, 2010

(30) Foreign Application Priority Data
May 12, 2007 (DE) .......................... 10 2007 022 316

(51) Int. Cl.
*F16C 33/58* (2006.01)
*F16C 33/76* (2006.01)
(52) U.S. Cl.
USPC .......................................... 384/569; 384/484

(58) Field of Classification Search .................. 384/482, 384/484, 559, 564, 565; 277/549, 551, 572
See application file for complete search history.

(56) References Cited

U.S. PATENT DOCUMENTS

| | | | | |
|---|---|---|---|---|
| 3,409,337 A | * | 11/1968 | Foote, Jr. | 384/482 |
| 3,479,100 A | | 11/1969 | Pitner | |
| 5,419,641 A | * | 5/1995 | Fujinami et al. | 384/470 |
| 5,632,563 A | * | 5/1997 | Zernickel | 384/564 |

FOREIGN PATENT DOCUMENTS

| | | |
|---|---|---|
| DE | 38 05 707 | 9/1989 |
| DE | 10 2005 027 486 A | 12/2006 |

* cited by examiner

*Primary Examiner* — Phillip A Johnson
(74) *Attorney, Agent, or Firm* — Lucas & Mercanti, LLP

(57) ABSTRACT

A radial needle bearing unit for supporting a shaft, which has an outer sleeve with at least one radially inwardly directed rim, and a cage guiding hearing needles. For sealing purposes, a sealing element is disposed in an annular space delimited by the rim and the cage. The sealing element is an outwardly expanding sealing ring made of a polymer material resting radially outwardly against the inner lateral surface of the outer sleeve and radially inwardly against the lateral surface of the shaft, so that a radial/radial seal is formed. The outer sleeve has, at least in one peripheral location, a holding lug which is formed by stamping or cutting and protrudes the lateral surface of the outer sleeve in a spring-loaded manner.

7 Claims, 4 Drawing Sheets

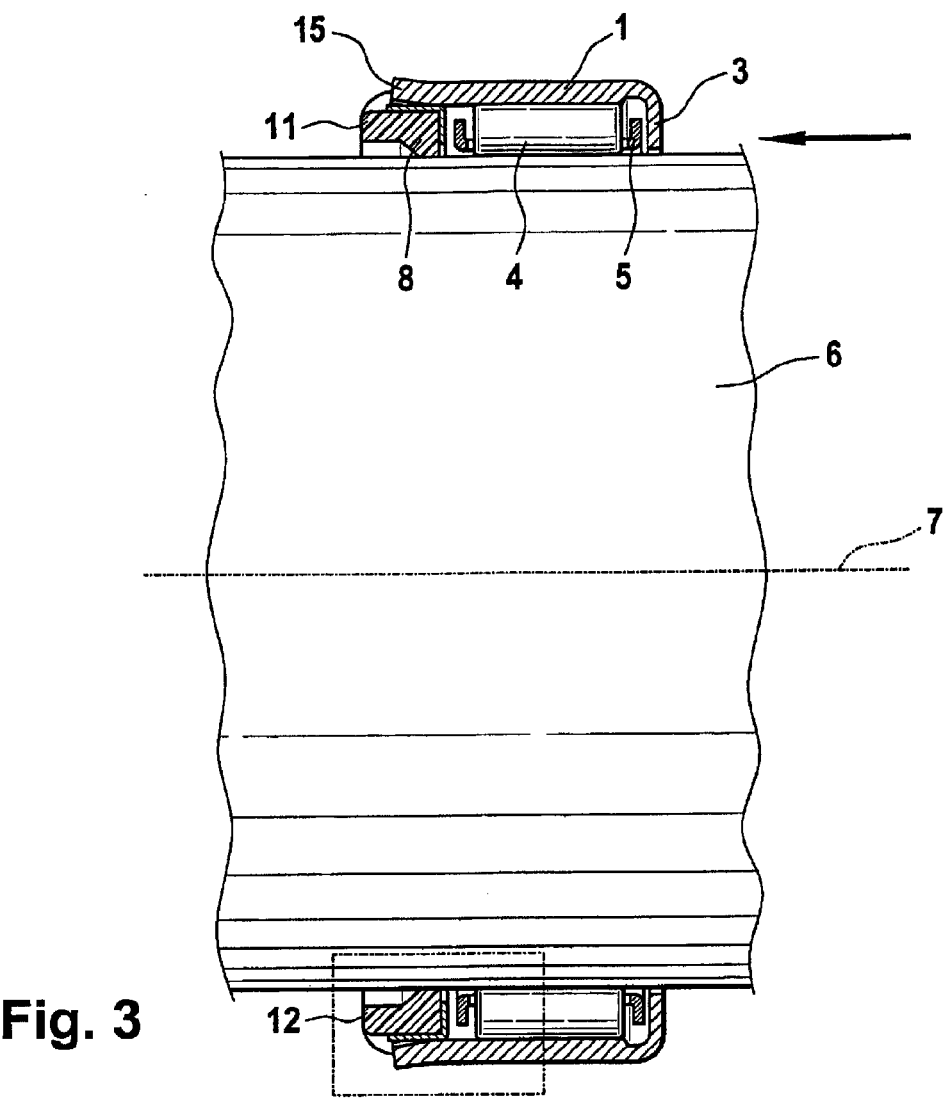
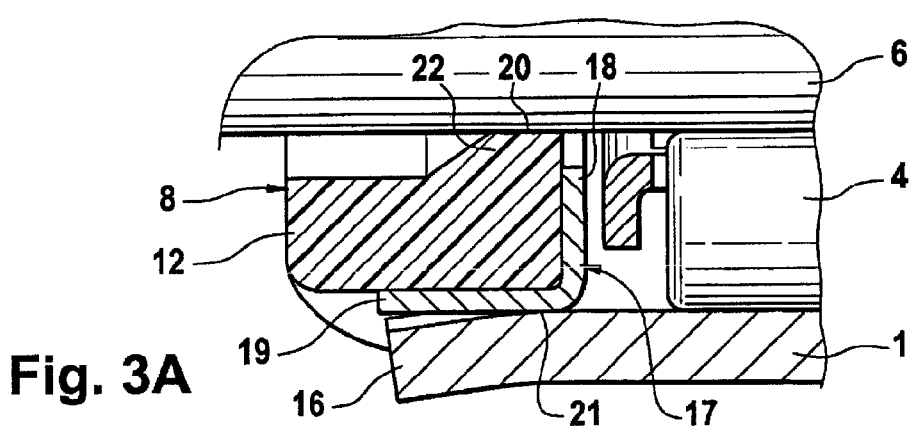
Fig. 3
Fig. 3A

RADIAL NEEDLE BEARING UNIT

This application is a 371 of PCT/EP2008/054480 filed Apr. 14, 2008, which in turn claims the priority of DE 10 2007 022 316.3 filed May 12, 2007, the priority of both applications is hereby claimed and both applications are incorporated by reference herein.

FIELD OF THE INVENTION

The invention relates to a radial needle bearing unit for mounting a shaft having an outer sleeve with at least one radially inwardly directed rim, a cage which guides bearing needles, a sealing element being arranged for sealing purposes in an annular space which is delimited by the rim and the cage.

BACKGROUND OF THE INVENTION

A needle bearing which is configured according to the generic type in this way is previously known, for example, from DE 10 2005 027 486 A1. According to FIG. 2 and the associated description, said needle bearing comprises an outer sleeve which is formed without the removal of material and has two radially inwardly directed rims which are arranged on both sides. A rolling body collar, which comprises bearing needles and a cage, is arranged within said outer sleeve, the outer raceway being formed by the inner circumferential face of the outer sleeve and the inner raceway being formed by a shaft (not shown). The rim which is arranged on the left and one rim of the cage are spaced apart from one another axially, with the result that a circumferential annular space is formed. A sealing element is arranged in said circumferential annular space, which sealing element is intended to restrict a throughflow of lubricant through the antifriction bearing, said sealing element being configured as a steel ring. Antifriction bearings of this type are always used in transmission engineering when unimpeded throughflow of oil through the bearing has to be avoided at all costs. This can be the case, for example, if a converter is used.

It has now been proven in practical operation that the throughflow of lubricant through the bearing is still too great. This is a result of the fact that the steel sealing ring forms a radial/axial seal. Whereas the radial seal is formed by the inner circumferential face of the steel sealing ring and the circumferential face of the shaft, the axial seal is provided by one end side of the steel sealing ring and by the inner side of the rim of the outer sleeve. On its outer circumferential face, the sealing ring has a considerable play with respect to the outer sleeve, with the result that oil can pass through there in the axial direction, which oil then overcomes the axial seal between the end side of the steel sealing ring and the rim without problems, because said axial seal does not function reliably enough. This is a result of the fact that a 100% perpendicular alignment of the rim is not possible, with the result that there is no continuous contact between the steel sealing ring and the rim. In other words, the axial seal is too permeable.

SUMMARY OF THE INVENTION

Proceeding from the disadvantages of the known prior art, the invention is therefore based on the object of redesigning a generic bearing of this type in such a way that the seal is improved, but at the same time there is a small throughflow of lubricant.

The invention achieves this object by virtue of the fact that the sealing element is configured as an outwardly expanding sealing ring made from a polymeric material which comes into contact radially on the outside with the inner circumferential face of the outer sleeve and radially on the inside with the circumferential face of the shaft, with the result that a radial/radial seal is formed, the outer sleeve being provided at least at one circumferential point with a holding lug which is formed by punching or cutting and protrudes resiliently beyond the circumferential face of the outer sleeve.

The means according to the invention achieve two advantages at the same time. Firstly, the seal is designed in such a way that a slight passage of lubricant through the bearing is ensured, and secondly a fixed seat of the bearing arrangement in a housing is realized. As a result of a slight overlap of the shaft diameter and the internal diameter of the sealing ring, the latter bears sliding against the circumferential face of the shaft, with the result that a passage of lubricant through the bearing is prevented at this location. As a result of the fact that the sealing ring is of outwardly radially expanding configuration, once again a passage of lubricant between the inner circumferential face of the outer sleeve and the circumferential face of the sealing ring is prevented, but at the same time lubricant can pass the bearing slightly in the region of the resilient holding tongue.

Further advantageous refinements of the invention are described in the subclaims.

For instance, there is provision according to one additional feature for the sealing ring to be composed of polytetrafluroethylene (PTFE). As a person skilled in the art knows, polytetrafluroethylene is distinguished by high temperature resistance (temperatures of up to 300" are possible for a brief time), by a low coefficient of friction and by high resistance to lubricant. In this context, it can also be advantageous if the polytetrafluroethylene is reinforced additionally by a fiber material.

Furthermore, it has proven advantageous that the sealing ring is surrounded partially on its circumferential face and its end face by an angled sleeve. The latter ensures that the stability of the sealing ring is increased, and that damage to the sealing ring is prevented by the cage of the bearing needles being burrowing into it.

According to another additional feature in the sealing ring is to be accommodated by the outer sleeve such that it cannot rotate, this being realized in such a way that the outer sleeve is provided, at least at one circumferential point in the region of the rim, with a cutout, into which a correspondingly formed projection of the sealing ring protrudes. Said rotationally locked arrangement of the sealing ring in the sleeve prevents its unnecessary wear, which would occur if it moved in the outer sleeve.

According to another additional feature, it has proven advantageous that the holding lug is arranged in the region of the cutout. As already explained, this arrangement ensures at the same time that firstly there is a fixed seat in the housing and secondly passage of lubricant is possible to a small extent at this location.

Finally, it is advantageous according to a last feature of the invention that the outer sleeve is provided at two circumferential points which lie opposite one another with in each case one cutout and with in each case one holding lug. As a result, firstly a fixed seat in the housing is possible, and secondly the minimization of the lubricant passage is possible, which would be canceled out by way of the further increasing number of holding lugs.

Further features of the invention result from the following description and from the drawings, in which two exemplary embodiments of the invention are shown in simplified form.

BRIEF DESCRIPTION OF THE DRAWINGS

In the drawings:

FIG. 1A shows a plan view of the bearing arrangement according to

FIG. 1, in the region of the holding lugs;

FIG. 3 shows a longitudinal section through the bearing arrangement according to the invention with a shaft;

FIG. 3A shows an enlarged illustration according to FIG. 3;

DETAILED DESCRIPTION OF THE DRAWINGS

Figure 1:
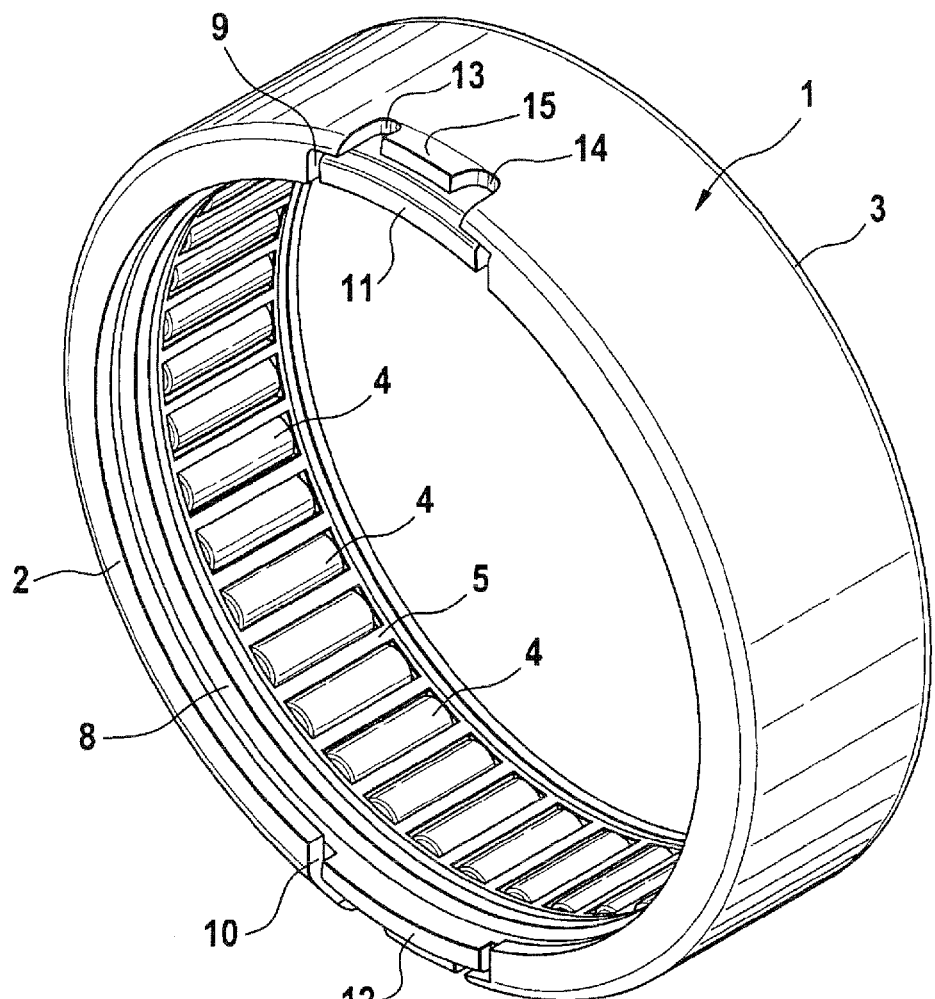
FIG. 1 shows a perspective illustration of a bearing arrangement according to the invention.
Figure 1A:
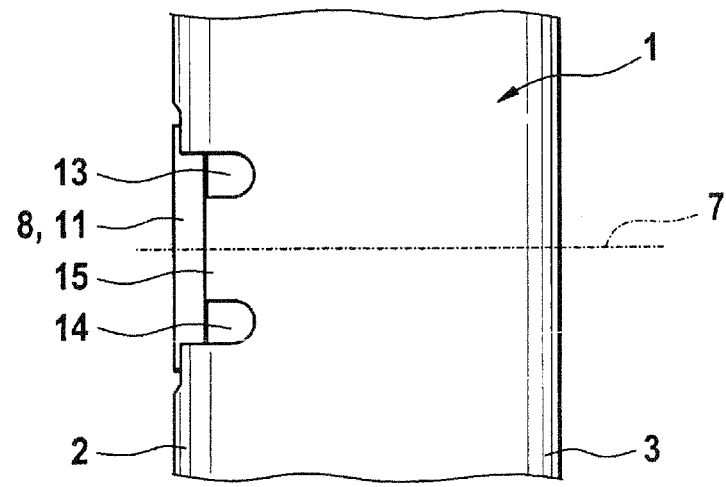
Figure 2:
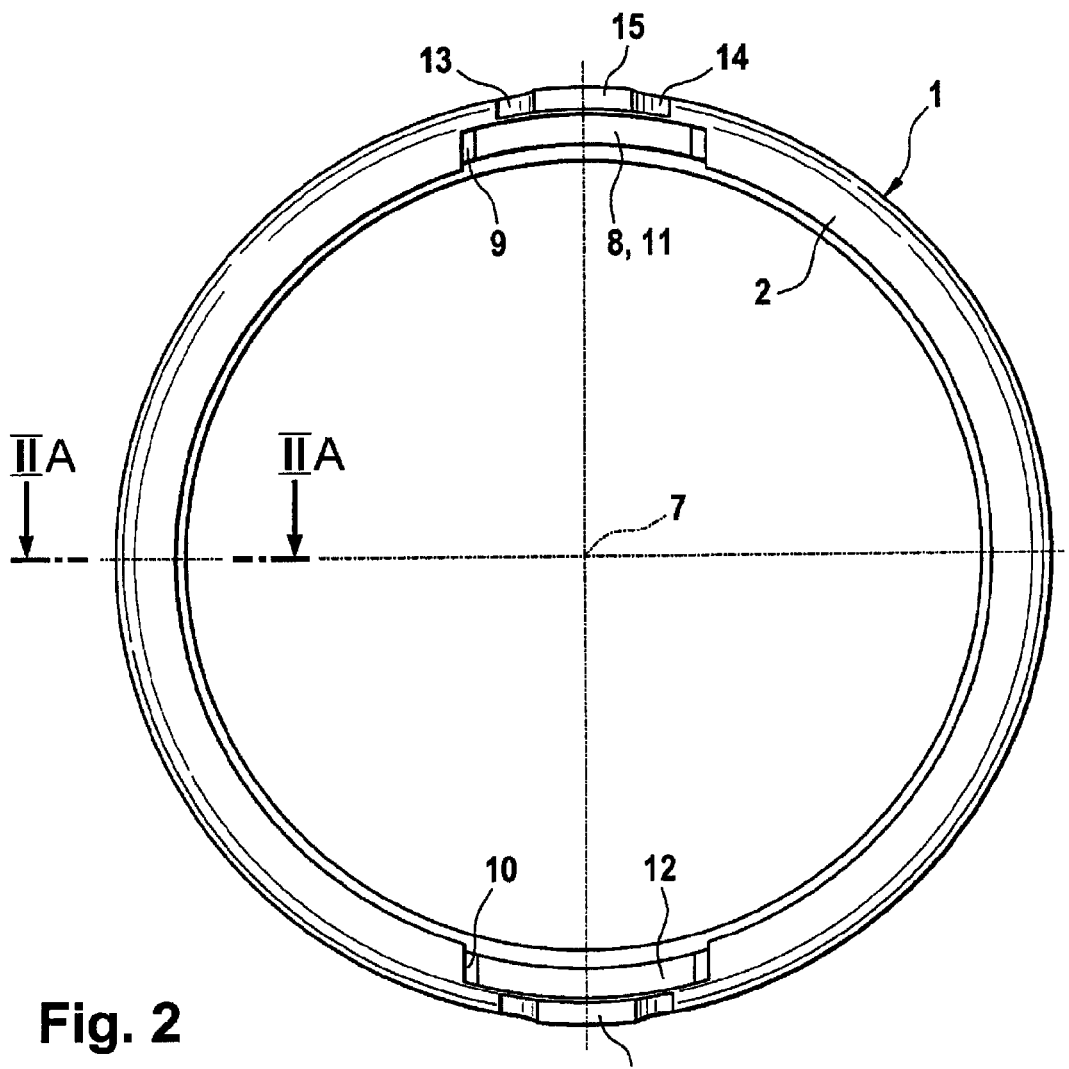
FIG. 2 shows a side view according to FIG. 1.
Figure 2A:
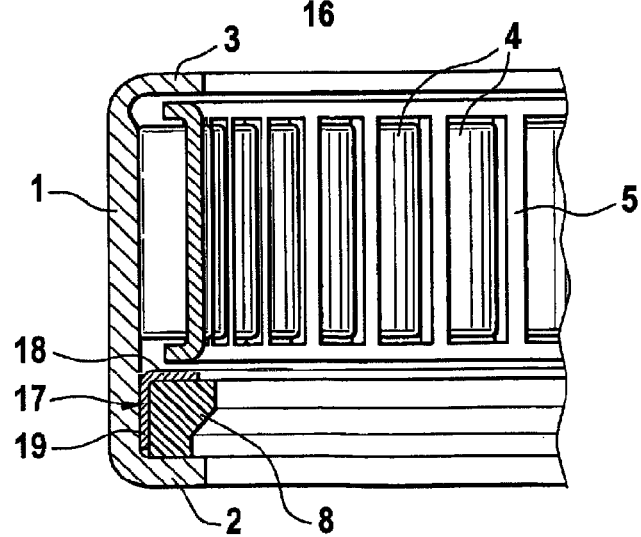
FIG. 2A shows a section along the line IIA-IIA in FIG. 2.

The radial needle bearing unit shown in FIGS. 1 to 3A comprises the thin-walled outer sleeve 1 which is formed without the removal of material, has in each case one radially inwardly angled rim 2, 3 on both sides, that is to say on the left and on the right edge, and in the receiving bore of which bearing needles 4 roll which are accommodated in a cage 5. During rotation of the shaft 6 about the bearing axis 7, the bearing needles 4 roll on one side on an inner raceway (not denoted in greater detail) which is provided by the circumferential face of the shaft 6 and on the other side on an outer raceway (likewise not denoted) which is formed by the inner circumferential face of the outer sleeve 1. Furthermore, as can be seen in particular from FIG. 2A, a circumferential annular space (not denoted), in which the sealing ring 8 is accommodated, is formed between the rim 2 of the outer sleeve 1 and the cage 5.

As can also be seen, the outer sleeve 1 is provided at two points which lie opposite one another in the circumferential direction with in each case one cutout 9, 10, into which in each case one axially aligned projection 11, 12 of the sealing ring 8 protrudes, with the result that the sealing ring 8 is held in the outer sleeve 1 by a form-fitting connection such that it cannot rotate. As can be seen in particular from FIG. 1, the cutouts 9, 10 are arranged both in the region of the rim 2 and also partially in the region of the circumferential face of the outer sleeve 1, the circumferential extent being greater in the rim region 2 than in the region of the circumferential face. Furthermore, as can be seen, in each case one holding lug 15, 16 which is delimited in the circumferential direction by undercuts 13, 14 arranged on both sides, is arranged in the region of the cutouts 9, 10. Said holding lugs 15, 16 are of resilient configuration and protrude beyond the circumferential face of the outer sleeve 1 and thus ensure a fixed seat of the radial needle bearing unit according to the invention in a housing (not shown). Furthermore, as can be seen, the sealing ring 8 is enclosed at least partially by an angled sleeve 17 made from a steel material, the angled sleeve 17 having a radially extending limb 18 and an axially extending limb 19. The sealing ring 11 is stabilized by said angled sleeve 17. A further advantage of the angled sleeve 17 is that the cage 5, which guides the bearing needles 4, cannot burrow into the sealing ring 8. As can also be seen, the radially extending limb 18 of the angled sleeve 17 does not extend as far as the circumferential face of the shaft 6, with the result that there is a satisfactory seal.

The sealing action of the radial needle bearing unit according to the invention and its slight possible passage for lubricant will be explained in greater detail using FIGS. 3 and 3A.

If lubricant then enters from the right according to the arrow in FIG. 3, it will first of all enter the bearing interior through the gap (not denoted) which is delimited by the rim 3 of the outer sleeve 1 and the circumferential face of the shaft 6. Subsequently, it passes to the left via the intermediate spaces between the bearing needles 4 which are spaced apart from one another in the circumferential direction, where it finally penetrates into the region which is delimited on one side by the end faces of the bearing needles 4 and on the other side by the sealing ring 8. As a glance at the enlarged illustration in FIG. 3A then shows, there are now two possibilities for the lubricant to leave the bearing to the outside: firstly through the sealing face 20 which is formed by the circumferential face of the shaft 6 and the sealing lip 22 of the sealing ring 8, and secondly through the sealing face 21 which is formed by the axially extending limb 19 of the angled sleeve 17 and the outer sleeve 1. As a result of the fact that the sealing face 21 has outwardly resilient holding lugs 15, 16, the lubricant will rather leave the bearing in the region of said holding lugs 15, 16, under the pressure which builds up, than in the region of the sealing face 20. The sealing face 20 is of uniform configuration on account of its overlap in the circumferential direction, while the sealing face 21 is interrupted slightly in the circumferential direction by the resilient holding lugs 15, 16, with the result that the desired leakage can be realized to a very small extent at this point.

Figure 4:
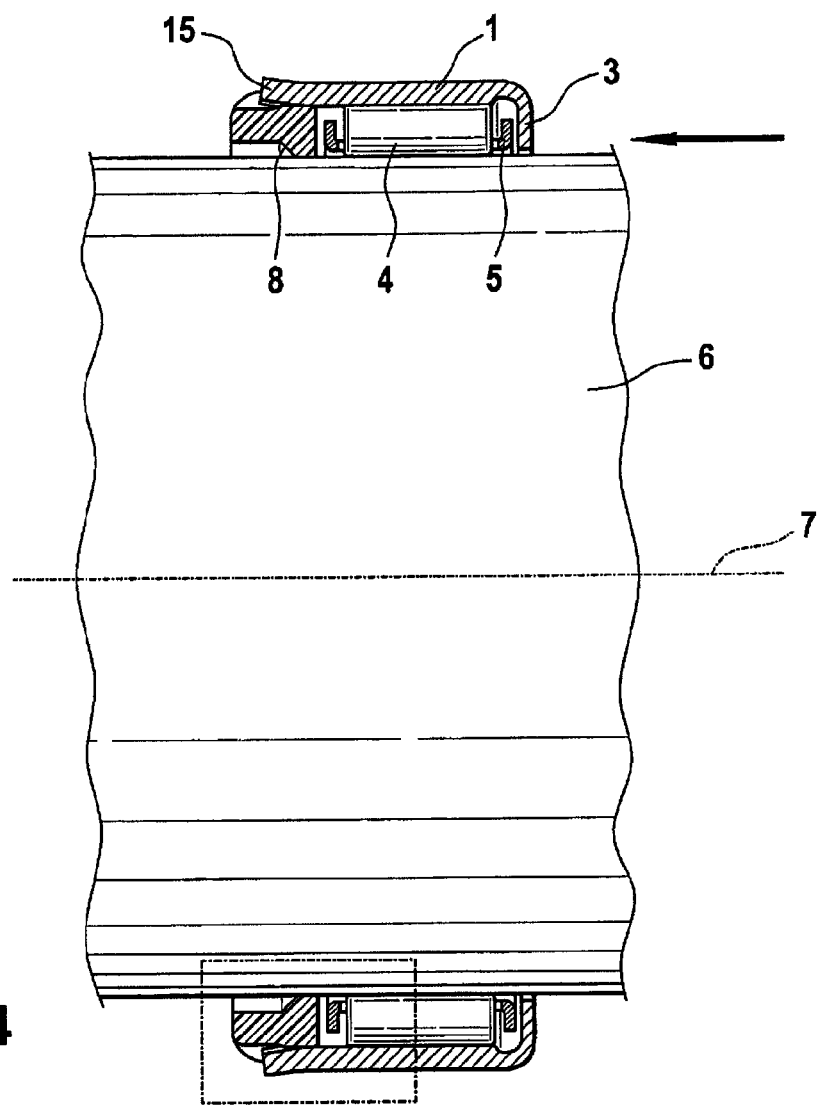
FIG. 4 shows a longitudinal section through a second variant of the bearing arrangement according to the invention.
Figure 4A:
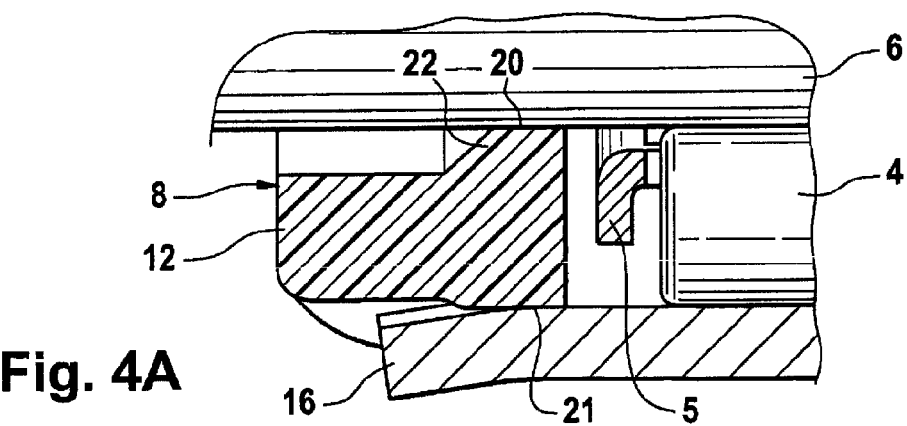
FIG. 4A shows an enlarged illustration of a detail according to FIG. 4.

FIGS. 4 and 4A show a further design variant of a bearing arrangement according to the invention. Said bearing arrangement differs from that described in FIGS. 1 to 3A only in that the sealing ring 8 is not designed with the angled sleeve 17. It therefore bears with its outer circumferential face directly against the inner circumferential face of the outer sleeve 1.

LIST OF DESIGNATIONS

1 Outer sleeve
2 Rim
3 Rim
4 Bearing needle
5 Cage
6 Shaft
7 Bearing axis
8 Sealing ring
9 Cutout
10 Cutout
11 Projection
12 Projection
13 Undercut
14 Undercut
15 Holding lug
16 Holding lug
17 Angled sleeve
18 Radially extending limb
19 Axially extending limb
20 Sealing face
21 Sealing face
22 Sealing lip

The invention claimed is:

1. A radial needle bearing unit for mounting a shaft, comprising:

an outer sleeve having at least one radially inwardly directed rim;
a cage guiding bearing needles;
a sealing element being arranged for sealing purposes in an annular space which is delimited by the rim and the cage, wherein the sealing element is configured as an outwardly expanding sealing ring made from a polymeric material which comes into contact radially on an outside with an inner circumferential face of the outer sleeve and radially on an inside with a circumferential face of a shaft forming a radial/radial seal, the outer sleeve having, at least at one circumferential point, a holding lug which is formed by punching or cutting and protrudes resiliently beyond the inner circumferential face of the outer sleeve, the holding lug facing a radial outer surface of the sealing element.

2. The radial needle bearing unit of claim 1, wherein the sealing ring is composed of polytetrafluroethylene.

3. The radial needle hearing unit of claim 1, wherein the sealing ring is surrounded partially on an circumferential face and an end face by an angled sleeve.

4. The radial needle bearing unit of claim 1, wherein the sealing ring is accommodated by the outer sleeve such that the sealing ring cannot rotate.

5. The radial needle hearing unit of claim 4, wherein the outer sleeve has, at least at one circumferential point in a region of the rim, a cutout, into which a correspondingly formed projection of the sealing ring protrudes.

6. The radial needle bearing unit of claim 5, wherein the holding lug is arranged in the region of the cutout.

7. The radial needle bearing unit of claim 1, wherein the outer sleeve has, at two circumferential points which lie opposite one another, one cutout and one holding lug.

* * * * *

UNITED STATES PATENT AND TRADEMARK OFFICE
CERTIFICATE OF CORRECTION

PATENT NO. : 8,425,123 B2  Page 1 of 1
APPLICATION NO. : 12/599752
DATED : April 23, 2013
INVENTOR(S) : Draser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this
Eighth Day of September, 2015

Michelle K. Lee
*Director of the United States Patent and Trademark Office*